US007898536B2

(12) United States Patent
Shin et al.

(10) Patent No.: US 7,898,536 B2
(45) Date of Patent: Mar. 1, 2011

(54) DISPLAY APPARATUS AND METHOD OF DRIVING THE SAME

(75) Inventors: Yong-Jin Shin, Asan-si (KR); Hyoung-Rae Lee, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 696 days.

(21) Appl. No.: 11/861,007

(22) Filed: Sep. 25, 2007

(65) Prior Publication Data

US 2008/0122814 A1 May 29, 2008

(30) Foreign Application Priority Data

Sep. 26, 2006 (KR) ...................... 10-2006-0093633

(51) Int. Cl.
*G06F 3/038* (2006.01)

(52) U.S. Cl. ............................ 345/204; 345/87; 345/99

(58) Field of Classification Search ................... 345/51, 345/53, 55, 87–90, 94–95, 98–100, 104, 345/204, 208–214; 349/149–150, 152
See application file for complete search history.

(56) References Cited

U.S. PATENT DOCUMENTS 6,982,694 B2 * 1/2006 Matsuzaki ................... 345/98
7,116,297 B2 * 10/2006 Koga et al. ..................... 345/87
7,176,866 B2 * 2/2007 Teraishi ........................ 345/87
2007/0080905 A1 * 4/2007 Takahara ..................... 345/76

* cited by examiner

*Primary Examiner*—Henry N Tran
*Assistant Examiner*—Mansour M Said
(74) *Attorney, Agent, or Firm*—Innovation Counsel LLP

(57) ABSTRACT

A display apparatus and a method of driving the same in which a selector outputs one of two high gamma values and one of two low gamma values in one frame unit in response to a selection signal. A gamma reference voltage generator outputs a high gamma reference voltage corresponding to the selected high gamma value and a low gamma reference voltage corresponding to the selected low gamma value. A data driving circuit outputs a first data voltage based on the high gamma reference voltage during a first active period and outputs a second data voltage based on the low gamma reference voltage during a second active period. Thus, a display panel may display an image using data voltages corresponding to different gamma curves in one frame unit, thereby improving visibility of the display apparatus.

21 Claims, 5 Drawing Sheets

DISPLAY APPARATUS AND METHOD OF DRIVING THE SAME

CROSS-REFERENCE TO RELATED APPLICATION

This application relies for priority upon Korean Patent Application No. 10-2006-93633, filed on Sep. 26, 2006, the contents of which are herein incorporated by reference in its entirety.

BACKGROUND OF THE INVENTION

1. Field of the Invention

The present invention relates to a display apparatus and a method of driving the same. More particularly, the present invention relates to a display apparatus capable of improving visibility and a method of driving the display apparatus.

2. Description of the Related Art

In order to improve a narrow viewing angle of a liquid crystal display (LCD), recently, patterned vertical alignment (PVA) mode, multi-domain vertical alignment (MVA) mode, and super-patterned vertical alignment (S-PVA) mode LCDs having wide viewing angle characteristics have been explored.

In particular, the S-PVA mode LCD includes pixels each of which has two sub-pixels. In order to form domains having different gray-scales in each of the pixels, the two sub-pixels serve as main and sub-pixel electrodes, respectively, to which two different sub-voltages are applied. Since the eyes of a user who looks at the LCD sense an intermediate value of the two sub-voltages, the LCD may prevent deterioration of a side viewing angle caused by a distortion of a gamma curve below the intermediate gray level.

However, in the S-PVA mode LCD, the brightness characteristic varies depending on the user's position. That is, a visibility obtained from the front position of the S-PVA mode LCD is different from a visibility obtained from the lateral position of the S-PVA mode LCD. As described above, if the visibility varies according to the user's position, a display quality of the S-PVA mode LCD is reduced.

SUMMARY OF THE INVENTION

The present invention provides a display apparatus capable of reducing a difference in visibility that is varied according to a viewing angle, thereby improving display quality.

The present invention provides a method of driving the display apparatus.

In one aspect of the present invention, a display apparatus includes a timing controller, a memory, a selector, a gamma reference voltage generator, a data driving circuit, a gate driving circuit, and a display panel.

The timing controller receives an external image signal and an external control signal from an outside and generates first and second timing control signals to output an image signal in synchronization with the first timing control signal. The memory stores N (N is an integer no less than 2) high gamma values and N low gamma values. The selector selects and outputs one of the N high gamma values and one of the N low gamma values in a predetermined i frame unit (i is an integer no less than 1) in response to a selection signal. The gamma reference voltage generator outputs a high gamma reference voltage corresponding to the selected high gamma value and a low gamma reference voltage corresponding to the selected low gamma value.

The data driving circuit receives the image signal in synchronization with the first timing control signal, converts the image signal into a first data voltage based on the high gamma reference voltage to output the first data voltage during a first active period, and converts the image signal into a second data voltage based on the low gamma reference voltage to output the second data voltage during a second active period. Responsive to the second timing control signal, the gate driving circuit outputs a first gate voltage during the first active period and outputs the second gate voltage during the second active period.

The display panel includes a plurality of pixels to display an image, and each of the pixels includes a first sub-pixel and a second sub-pixel. The first sub-pixel charges the first data voltage in response to the first gate voltage and the second sub-pixel charges the second data voltage in response to the second gate voltage.

In another aspect of the present invention, a method of driving a display apparatus is provided as follows. The display apparatus receives an image signal from an outside and selects one of N (N is an integer no less than 2) high gamma values and one of N low gamma values in a predetermined i frame unit (i is an integer no less than 1) in response to a selection signal. Then, the display apparatus outputs a high gamma reference voltage corresponding to the selected high gamma value and a low gamma reference voltage corresponding to the selected low gamma value. The display apparatus converts the image signal into a first data voltage based on the high gamma reference voltage during a first active period and converts the image signal into a second data voltage based on the low gamma reference voltage during a second active period. The display apparatus outputs the first gate voltage during the first active period and outputs the second gate voltage during the second active period. The display apparatus charges the first data voltage in response to the first gate voltage and charges the second data voltage in response to the second gate voltage to display an image.

According to the above, the image is displayed in one frame unit using data voltages corresponding to different gamma curves, so that the variation in visibility as a function of viewing angle can be reduced and the display quality of the display apparatus can be improved.

BRIEF DESCRIPTION OF THE DRAWINGS

The above and other advantages of the present invention will become readily apparent with reference to the following detailed description when considered in conjunction with the accompanying drawings wherein.

DESCRIPTION OF THE EMBODIMENTS

Hereinafter, embodiments of the present invention will be described in detail with reference to the accompanying drawings.

Figure 1:
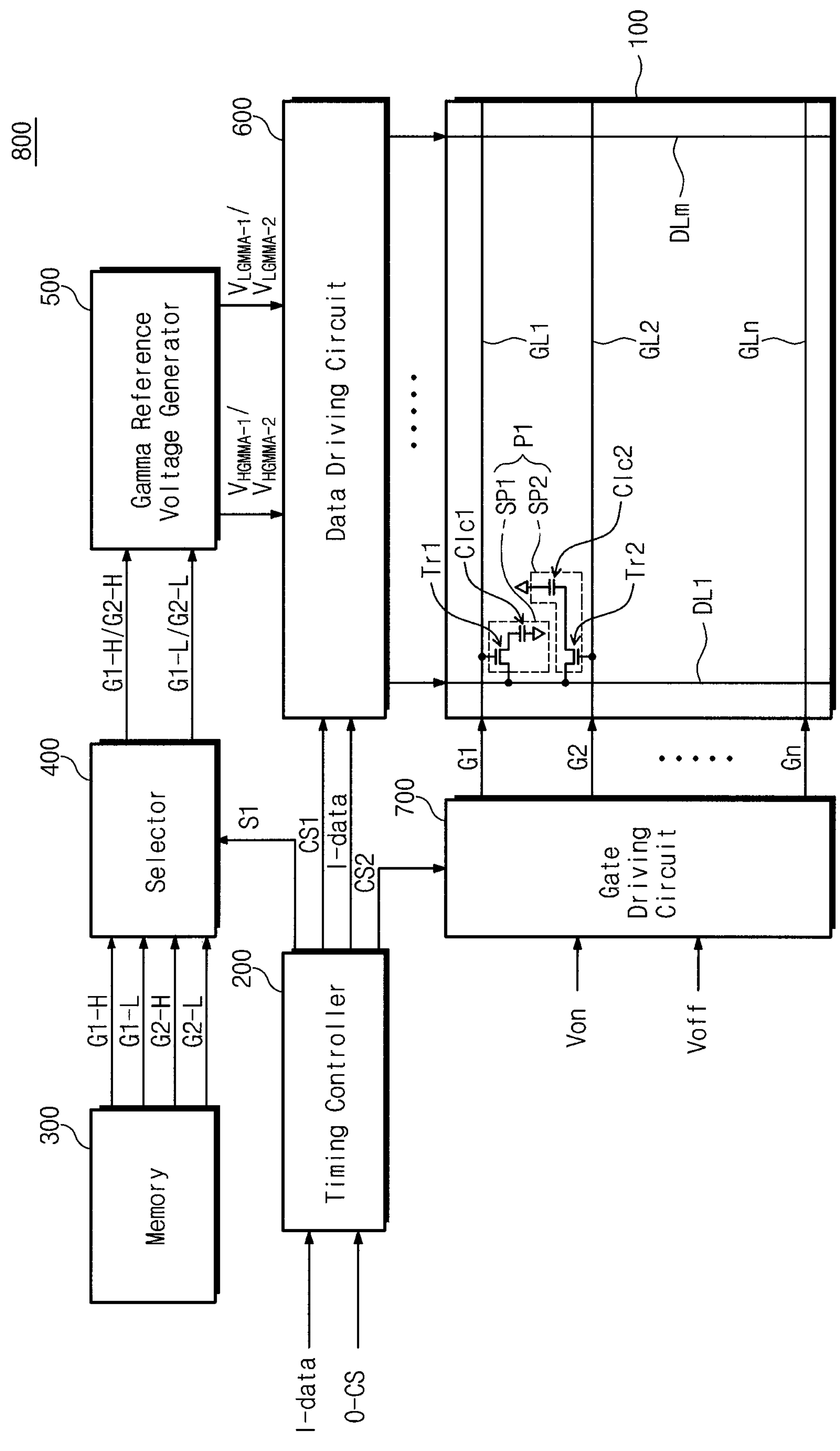
FIG. 1 is a block diagram showing a super-patterned vertical alignment (S-PVA) mode liquid crystal display (LCD) according to one embodiment of the present invention.

FIG. 1 is a block diagram showing an exemplary embodiment of a super-patterned vertical alignment (S-PVA) mode liquid crystal display (LCD) according to one embodiment of the present invention.

Referring to FIG. 1, the S-PVA mode LCD 800 includes a display panel 100, a timing controller 200, a memory 300, a selector 400, a gamma reference voltage generator 500, a data driving circuit 600, and a gate driving circuit 700.

The display panel 100 includes a plurality of gate lines GL1 to GLn and a plurality of data lines DL1 to DLm. A plurality of pixel regions prepared in a form of a matrix is defined by the gate lines GL1 to GLn and the data lines DL1 to DLm in the display panel 100. Each of the pixel regions includes a pixel P1 having first and second sub-pixels SP1 and SP2. The first sub-pixel SP1 includes a first thin film transistor (TFT) Tr1 and a first liquid crystal capacitor Clc1. The second sub-pixel SP2 includes a second TFT Tr2 and a second liquid crystal capacitor Clc2.

In the first pixel P1, the first and second sub-pixels SP1 and SP2 are connected to the first and second gate lines GL1 and GL2, respectively, and are commonly connected to the first data line DL1. In detail, the first TFT Tr1 includes a control electrode connected to the first gate line GL1, an input electrode connected to the first data line DL1, and an output electrode connected to a first sub-pixel electrode that serves as a first electrode of the first liquid crystal capacitor Clc1. In addition, the second TFT Tr2 includes a control electrode connected to the second gate line GL2, an input electrode connected to the first data line DL1, and an output electrode connected to the second sub-pixel electrode that serves as a first electrode of the second liquid crystal capacitor Clc2. In the present exemplary embodiment, a common electrode is provided to the display panel 100 as second electrodes of the first and second liquid crystal capacitors Clc1 and Clc2.

The timing controller 200 receives an image signal I-data and various control signals O-CS from an external graphic controller (not shown). The timing controller 200 receives the various control signals O-CS, such as a vertical synchronizing signal, a horizontal synchronizing signal, a main clock, and a data enable signal, to output first and second timing control signals CS1 and CS2. The image signal I-data is applied to the data driving circuit 600 in synchronization with the first timing control signal CS1. The second timing control signal CS2 is applied to the gate driving circuit 700.

The first timing control signal CS1 that controls the operation of the data driving circuit 600 includes a horizontal start signal, an inversion signal, and an output command signal. The second timing control signal CS2 that controls the operation of the gate driving circuit 700 includes a vertical start signal, a gate clock signal, and an output enable signal.

In addition, the timing controller 200 generates a selection signal S1 to apply the selection signal S1 to the selector 400.

First and second high gamma values G1-H and G2-H and first and second low gamma values G1-L and G2-L are previously stored in the memory 300. The first and second high gamma values G1-H and G2-H and the first and second low gamma values G1-L and G2-L that are previously stored in the memory 300 are applied to the selector 400 every frame. The selector 400 selects one of the first and second high gamma values G1-H and G2-H and one of the first and second low gamma values G1-L and G2-L in response to the selection signal S1. More specifically, the selector 400 outputs the first high gamma value G1-H and the first low gamma value G1-L during an odd-numbered frame and outputs the second high gamma value G2-H and the second low gamma value G2-L during an even-numbered frame.

In the present exemplary embodiment, the first high gamma value G1-H and the first low gamma value G1-L represent the highest transmittance at a front viewing angle and the second high gamma value G2-H and the second low gamma value G2-L represent the highest transmittance at a side viewing angle. Here, the front viewing angle is of about 90° and the side viewing angle is of about 45°. Therefore, the first high gamma value G1-H is smaller than the second high gamma value G2-H and the first low gamma value G1-L is smaller than the second low gamma value G2-L.

The gamma reference voltage generator 500 receives the high gamma values and the low gamma values that are selected by the selector 400. In particular, the gamma reference voltage generator 500 receives the first high gamma value G1-H and the first low gamma value G1-L during the odd-numbered frame and receives the second high gamma value G2-H and the second low gamma value G2-L during the even-numbered frame.

The gamma reference voltage generator 500 outputs a first high gamma reference voltage $V_{HGMMA\text{-}1}$ corresponding to the first high gamma value G1-H and a first low gamma reference voltage $V_{LGMMA\text{-}1}$ corresponding to the first low gamma value G1-L in the odd-numbered frame. In addition, the gamma reference voltage generator 500 outputs a second high gamma reference voltage $V_{HGMMA\text{-}2}$ corresponding to the second high gamma value G2-H and a second low gamma reference voltage $V_{LGMMA\text{-}2}$ corresponding to the second low gamma value G2-L in the even-numbered frame.

The timing controller 200, the selector 300, and the gamma reference voltage generator 500 illustrated in FIG. 1 may be prepared in the form of chips.

The data driving circuit 600 receives the image signal I-data in synchronization with the first timing control signal CS1. The data driving circuit 600 receives the first high gamma reference voltage $V_{HGMMA\text{-}1}$ and the first low gamma reference voltage $V_{LGMMA\text{-}1}$ from the gamma reference voltage generator 500 in the odd-numbered frame. Further, the data driving circuit 600 receives the second high gamma reference voltage $V_{HGMMA\text{-}2}$ and the second low gamma reference voltage $V_{LGMMA\text{-}2}$ from the gamma reference voltage generator 500 in the even-numbered frame.

The first timing control signal CS1 includes a first clock corresponding to a first active period (in which the first sub-pixel is turned on) and a second clock corresponding to a second active period (in which the second sub-pixel is turned on). The first and second clocks are provided to the gamma reference voltage generator 500. Therefore, the gamma reference voltage generator 500 outputs the first high gamma reference voltage $V_{HGMMA\text{-}1}$ in synchronization with the first clock and outputs the first low gamma reference voltage $V_{LGMMA\text{-}1}$ in synchronization with the second clock in the odd-numbered frame. In addition, the gamma reference voltage generator 500 outputs the second high gamma reference voltage $V_{HGMMA\text{-}2}$ in synchronization with the first clock and outputs the second low gamma reference voltage $V_{LGMMA\text{-}2}$ in synchronization with the second clock in the even-numbered frame.

The data driving circuit 600 converts the image signal I-data into a first data voltage based on the first high gamma reference voltage $V_{HGMMA\text{-}1}$ to output the first data voltage in the first active period of the odd-numbered frame and converts the image signal I-data into a second data voltage based on the first low gamma reference voltage $V_{LGMMA\text{-}1}$ to output the second data voltage in the second active period of the odd-numbered frame. Here, the first data voltage has a voltage level higher than a voltage level of the second data voltage.

In addition, the data driving circuit 600 converts the image signal I-data into a third data voltage based on the second high gamma reference voltage $V_{HGMMA\text{-}2}$ to output the third data voltage in the first active period of the even-numbered frame and converts the image signal I-data into a fourth data voltage based on the second low gamma reference voltage $V_{LGMMA\text{-}2}$ to output the fourth data voltage in the second active period of the even-numbered frame. Here, the third data voltage has a voltage level higher than a voltage level of the fourth data voltage.

The data driving circuit 600 is electrically connected to the data lines DL1 to DLm arranged on the display panel 100. Therefore, the first data voltage is applied to the data lines DL1 to DLm in the first active period of the odd-numbered frame, and the second data voltage is applied to the data lines DL1 to DLm in the second active period of the odd-numbered frame. In addition, the third data voltage is applied to the data lines DL1 to DLm in the first active period of the even-numbered frame, and the fourth data voltage is applied to the data lines DL1 to DLm in the second active period of the even-numbered frame.

The data driving circuit 600 is prepared in the form of a chip. The data driving circuit 600 is mounted on the display panel 100 through a chip on glass (COG) method or is mounted on a film (not shown) attached to the display panel 100 through a chip on film (COF) method.

The gate driving circuit 700 receives a gate on voltage Von and a gate off voltage Voff from an outside and sequentially outputs first to n-th gate voltages G1 to Gn in response to the second timing control signal CS2 from the timing controller 500. The gate driving circuit 700 is electrically connected to the gate lines GL1 to GLn arranged on the display panel 100. Therefore, the gate driving circuit 700 applies the first gate voltage G1 to the first gate line GL1 during the first active period, which corresponds to an earlier H/2 period of 1H period during which a first pixel row is driven. In addition, the gate driving circuit 700 applies the second gate voltage G2 to the second gate line GL2 during the second active period, which corresponds to a later H/2 period of the 1H period.

Similar to the data driving circuit 600, the gate driving circuit 700 is prepared in a form of a chip. The gate driving circuit 700 is mounted on the display panel 100 by the COG method or is mounted on the film (not shown) attached to the display panel 100 by the COF method.

In addition, in order to reduce the number of chips used for the LCD 800, the gate driving circuit 700 may be directly formed on the display panel 100 through a thin film process applied to form the pixels.

Figure 2:
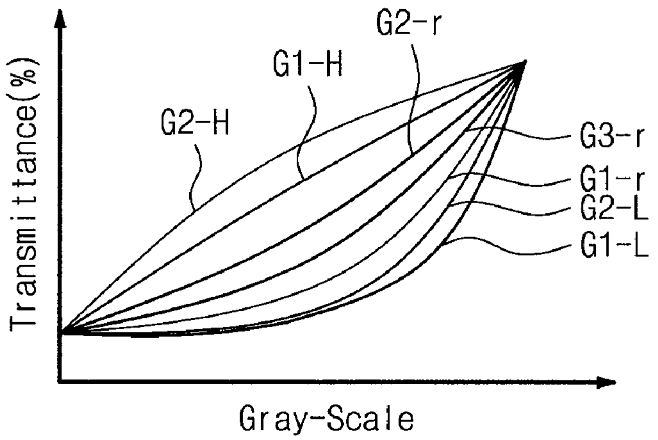
FIG. 2 shows plots of gamma curves of the S-PVA mode LCD illustrated in FIG. 1.

FIG. 2 is a plot illustrating a gamma curve of the SPVA mode LCD illustrated in FIG. 1.

Referring to FIG. 2, the first and second sub-pixels SP1 and SP2 (illustrated in FIG. 1) of the display panel 100 (see, FIG. 1) receive the first and second data voltages corresponding to a first high gamma curve having the first high gamma value G1-H and a first low gamma curve having the first low gamma value G1-L in the odd-numbered frame. That is, the display panel 100 displays an image using the first data voltage corresponding to the first high gamma curve for the earlier H/2 period of the 1H period, and displays an image using the second data voltage corresponding to the first low gamma curve for the later H/2 period of the 1H period.

Therefore, a user recognizes the image of the LCD 800 (see, FIG. 1) as a first reference gamma curve (G1-*r*) having a gamma value corresponding to an average value between the first high gamma value G1-H and the first low gamma value G1-L. Here, since the first reference gamma curve (G1-*r*) has the same gamma value as a front gamma curve, the first reference gamma curve G1-*r* has higher visibility than that of the first high gamma curve and the first low gamma curve.

In addition, the first and second sub-pixels SP1 and SP2 of the display panel 100 receive the third and fourth data voltages corresponding to the second high gamma curve having the second high gamma value G2-H and the second low gamma curve having the second low gamma value G2-L in the even frame. That is, the display panel 100 displays an image using the third data voltage corresponding to the second high gamma curve for the earlier H/2 period of the 1H period and displays an image using the fourth data voltage corresponding to the second low gamma curve for the later H/2 period of the 1H period.

Therefore, the user recognizes the image displayed on the LCD 800 as a second reference gamma curve G2-*r* having a gamma value corresponding to an average value between the second high gamma value G2-H and the second low gamma value G2-L. Here, since the second reference gamma curve G2-*r* has the same gamma curve as a side gamma curve, the second reference gamma curve G2-*r* has higher visibility that that of the second high gamma curve and the second low gamma curve.

As a result, data voltages corresponding to different gamma curves are applied to the first and second sub-pixels SP1 and SP2, respectively, so that the visibility of the LCD 800 may be improved.

In addition, the gamma characteristic of the image displayed on the LCD 800 changes at every frame. That is, the image displayed on the LCD 800 corresponds to the first reference gamma curve G1-*r* having the front gamma value in the odd-numbered frame and corresponds to the second reference gamma curve G2-*r* having the side gamma value in the even-numbered frame.

Therefore, the user recognizes the image displayed on the LCD 800 as a third reference gamma curve G3-*r* having a gamma value corresponding to an average value between the front gamma value and the side gamma value. As described above, the gamma characteristic of the LCD 800 alternately changes at every frame to reduce a difference in visibility, which may vary according to user's position relative to the LCD 800. As a result, the visibility of the LCD 800 is improved.

As an example of an embodiment of the present invention, a structure has been described that the high and low gamma values are differently applied during one frame, but the high and low gamma values can be differently applied during two frames or more.

Figure 3:
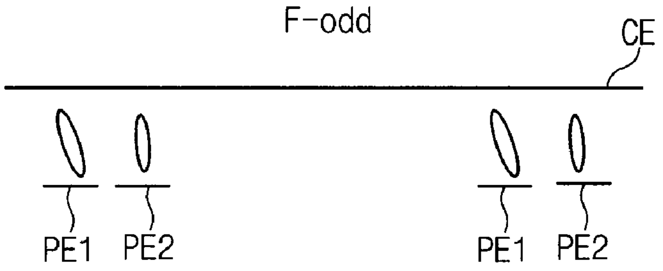
FIG. 3 is a view illustrating an alignment state of liquid crystal molecules during an odd-numbered frame period in the S-PVA mode LCD illustrated in FIG. 1.
Figure 4:
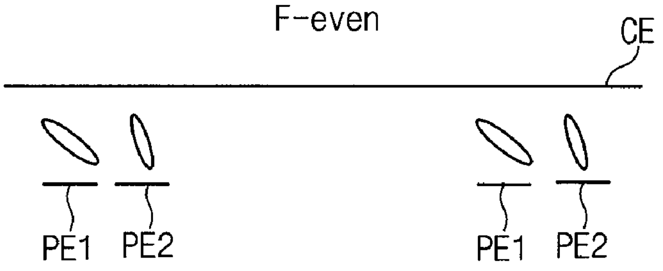
FIG. 4 is a view illustrating an alignment state of liquid crystal molecules during an even-numbered frame period in the S-PVA mode LCD illustrated in FIG. 1.

FIG. 3 is a view illustrating an alignment state of liquid crystal molecules during an odd-numbered frame period in the S-PVA mode LCD illustrated in FIG. 1, and FIG. 4 is a view illustrating an alignment state of liquid crystal molecules during an even-numbered frame period in the S-PVA mode LCD illustrated in FIG. 1.

Referring to FIGS. 3 and 4, the liquid crystal molecules interposed between the first sub-pixel electrode PE1 and the common electrode CE are arranged in response to the first data voltage corresponding to the first high gamma curve in the odd-numbered frame F-odd, and the liquid crystal molecules interposed between the second sub-pixel electrode PE2 and the common electrode CE are arranged in response to the second data voltage corresponding to the first low gamma curve in the odd-numbered frame F-odd.

On the other hand, the liquid crystal molecules interposed between the first sub-pixel electrode PE1 and the common electrode CE are arranged in response to the third data voltage corresponding to the second high gamma curve in the even-numbered frame F-even, and the liquid crystal molecules interposed between the second sub-pixel electrode PE2 and the common electrode CE are arranged in response to the fourth data voltage corresponding to the second low gamma curve in the even-numbered frame F-even.

In the present exemplary embodiment, the first high gamma curve and the first low gamma curve have the front gamma value and the second high gamma curve and the second low gamma curve have the side gamma value. Therefore, the liquid crystal molecules in the even-numbered frame F-even are more inclined against the front (that is, a vertical direction) than the liquid crystal molecules in the odd-numbered frame F-odd.

As described above, the data voltages corresponding to the different gamma curves are alternately applied to the first and second sub-pixel electrodes PE1 and PE2 in one frame unit. Therefore, the user can recognize an average value between the front visibility and the side visibility, so that a difference between the front visibility and the side visibility can be reduced. As a result, the visibility of the LCD 800 can be improved.

Figure 5:
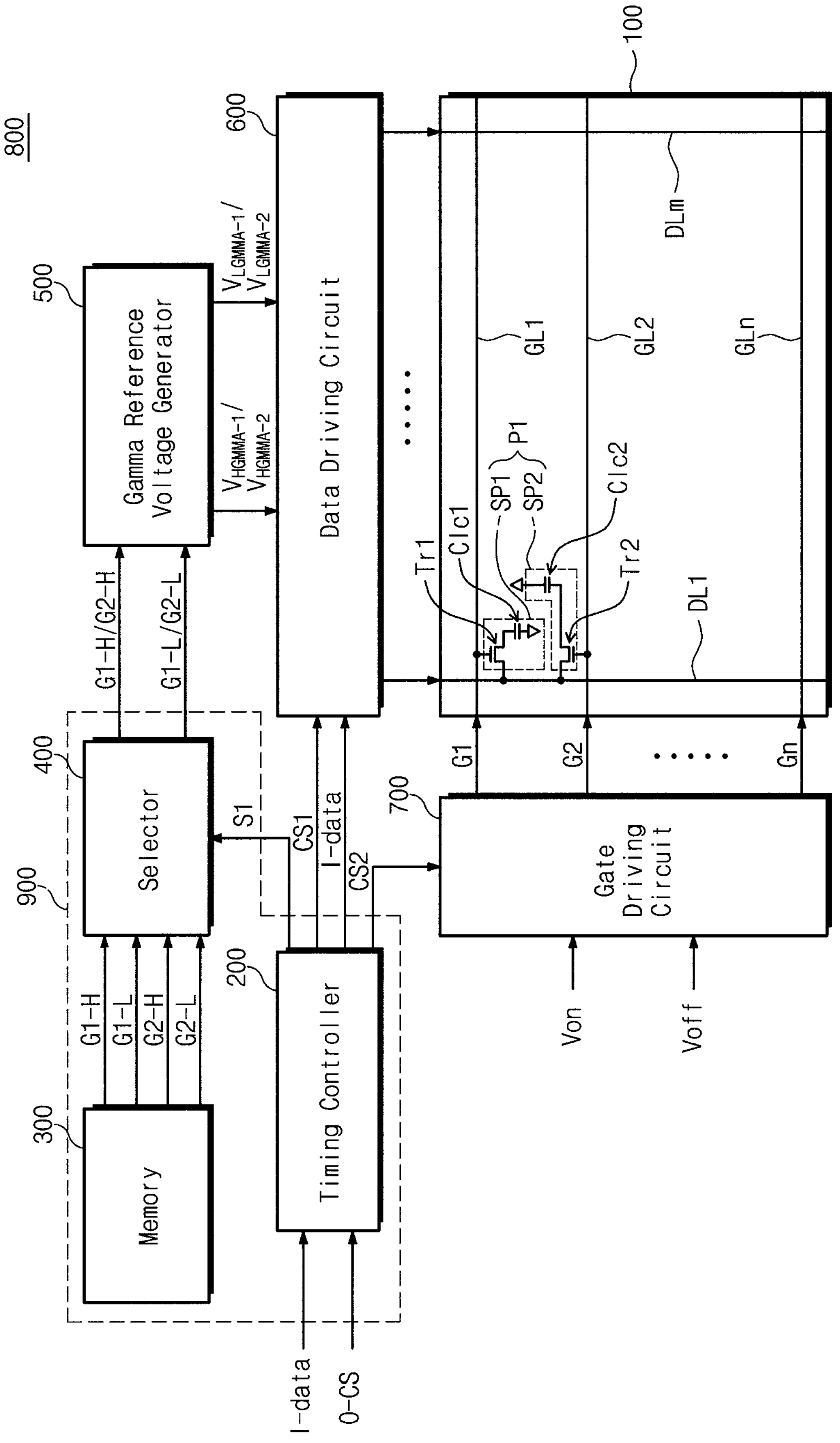
FIG. 5 is a block diagram showing another S-PVA mode LCD according to another embodiment of the present invention.

FIG. 5 is a block diagram showing another S-PVA LCD according to another embodiment of the present invention. In FIG. 5, the same reference numerals denote the same elements illustrated in FIG. 1, and thus the detailed descriptions of the same elements are not repeated.

Referring to FIG. 5, the S-PVA mode LCD 800 includes a display panel 100, a timing controller 200, a memory 300, a selector 400, a gamma reference voltage generator 500, a data driving circuit 600, and a gate driving circuit 700.

The timing controller 200 includes a control chip 900. In the present exemplary embodiment, the selector 400 and the memory 300 are mounted in the control chip 900. Therefore, the number of chips used for the LCD 800 can be reduced.

Figure 6:
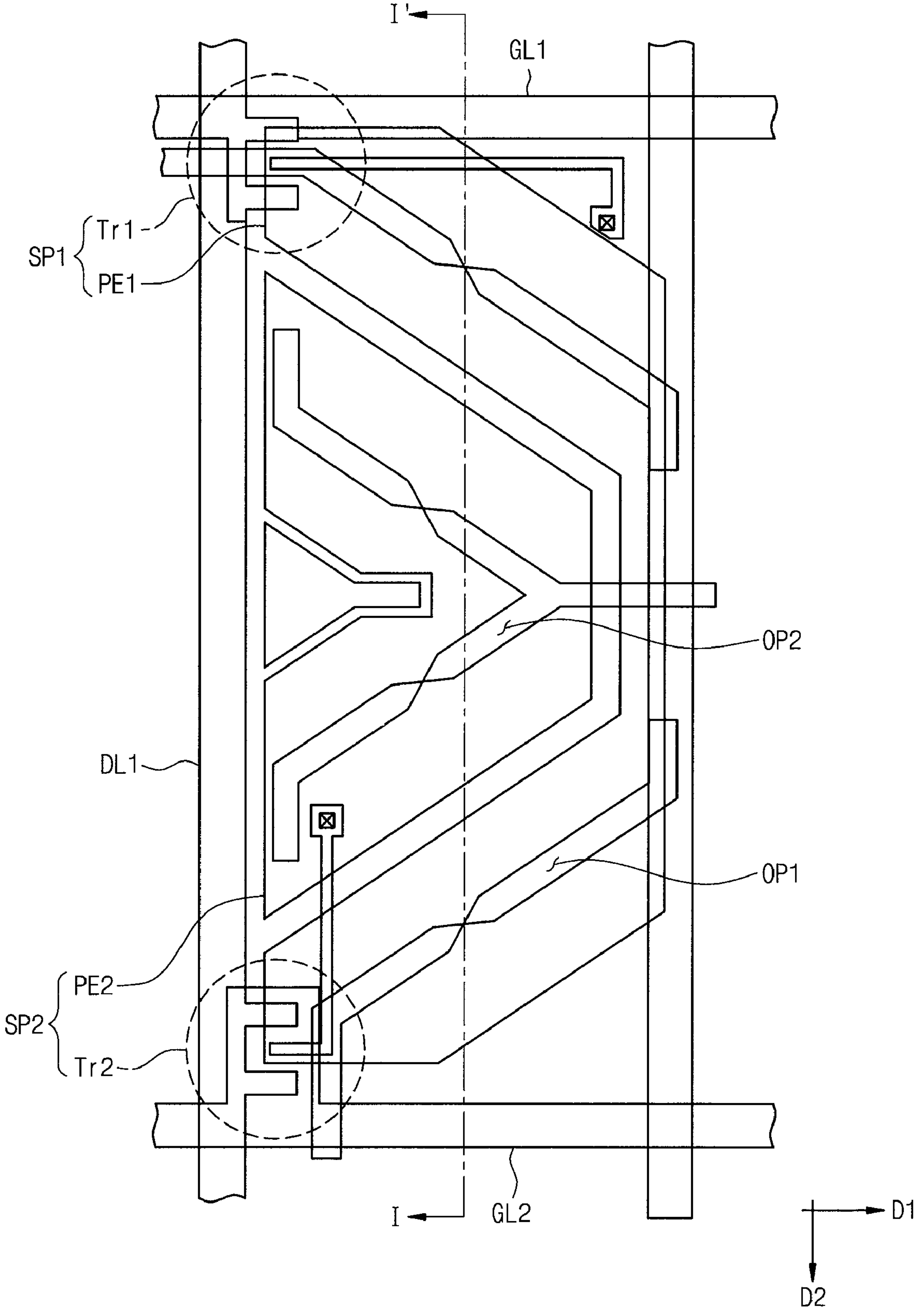
FIG. 6 is a plan view illustrating a layout of a pixel for use in a display panel shown in FIGS. 1 and 5.
Figure 7:
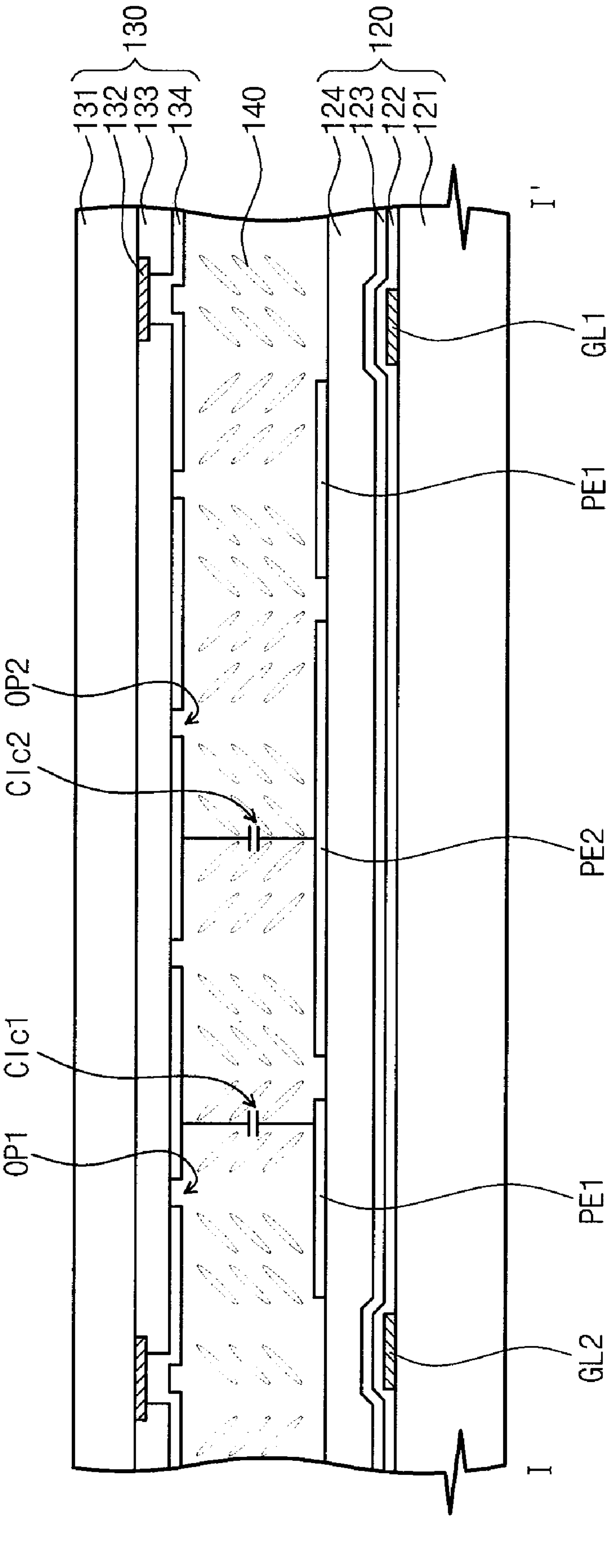
FIG. 7 is a cross-sectional view taken along a line I-I' in FIG. 6.

FIG. 6 is a view illustrating a layout of a pixel included in the display panel shown in FIGS. 1 and 5, and FIG. 7 is a sectional view taken along a line I-I' illustrated in FIG. 6.

Referring to FIGS. 6 and 7, the display panel 100 includes an array substrate 120, a color filter substrate 130 that faces the array substrate 120, and a liquid crystal layer 140 interposed between the array substrate 120 and the color filter substrate 130 to display an image.

A pixel region is defined by the first and second gate lines GL1 and GL2 extending in a first direction D1 and the first data line DL1 extending in a second direction D2 substantially perpendicular to the first direction D1 on a first base substrate 121 of the array substrate 120. The pixel including the first sub-pixel SP1 and the second sub-pixel SP2 is arranged in the pixel region. In particular, the first sub-pixel SP1 includes the first TFT Tr1 and the first sub-pixel electrode PE1 that serves as the first electrode of the first liquid crystal capacitor Clc1, and the second sub-pixel SP2 includes the second TFT Tr2 and the second sub-pixel electrode PE2 that serves as the first electrode of the second liquid crystal capacitor Clc2 on the array substrate 120.

The gate electrode of the first TFT Tr1 branches from the first gate line GL1 and the gate electrode of the second TFT Tr2 branches from the second gate line GL2. The source electrodes of the first and second TFTs Tr1 and Tr2 branch from the first data line DL1. The drain electrode of the first TFT Tr1 is electrically connected to the first sub-pixel electrode PE1 and the drain electrode of the second TFT Tr2 is electrically connected to the second sub-pixel electrode PE2.

As illustrated in FIG. 3, the array substrate 120 covers the first and second gate lines GL1 and GL2 and further includes a gate insulating layer 121, a protective layer 122, and an organic insulating layer 123 provided under the first and second sub-pixel electrodes PE1 and PE2.

The color filter substrate 130 includes a second base substrate 131 on which a black matrix 132, a color filter layer 133, and a common electrode 134 are formed. The black matrix 132 is formed in a non-effective display region where the first and second gate lines GL1 and GL2 are formed, thereby preventing light from being leaked through the non-effective display region. The color filter layer 133 includes red, green, and blue pixels, so the light that has passed through the liquid crystal layer 140 has a predetermined color.

The common electrode 134 that serves as the second electrodes of the first and second liquid crystal capacitors Clc1 and Clc2 is formed on the color filter layer 133. The common electrode 134 is partially removed in correspondence with a center of the first sub-pixel electrode PE1 and is partially removed in correspondence with a center of the second sub-pixel electrode PE2. Therefore, the common electrode 134 is provided with a first opening OP1 formed corresponding to the center of the first sub-pixel electrode PE1 and a second opening OP2 formed corresponding to the center of the second sub-pixel electrode PE2. Thus, eight domains, in which the liquid crystal molecules included in the liquid crystal layer 140 are arranged in different directions, are formed in the pixel region.

Plural domains, in which the liquid crystal molecules are arranged in different directions, are formed in one pixel region by the first and second openings OP1 and OP2. As described above, the liquid crystal molecules are arranged in different directions in accordance with the domains, so that a change in visibility in accordance with a viewing angle is reduced due to a compensation effect between the domains. Therefore, the display apparatus may have the wide viewing angle.

According to the above-described display apparatus and the method of driving the same, the image is displayed using the data voltages corresponding to the different gamma curves in one frame unit in the S-PVA mode LCD, so that the difference in visibility between the front viewing angle and the side viewing angle is reduced and the display quality of the display apparatus is improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:

a timing controller adapted to receive an image signal and a control signal, the timing controller being operative to generate a first timing control signal, a second timing control signal and an image signal;

a memory having N high gamma values and N low gamma values stored therein, wherein N is an integer not less than 2;

a selector coupled to the memory and being operative to select one of the N high gamma values and one of the N low gamma values in a predetermined i frame unit in response to a selection signal, wherein i is an integer not less than 1;

a gamma reference voltage generator coupled to the selector, the gamma reference voltage generator being operative to output a high gamma reference voltage corresponding to the selected high gamma value and a low gamma reference voltage corresponding to the selected low gamma value;

a data driving circuit coupled to the gamma reference voltage generator, the data driving circuit receiving the image signal in synchronization with the first timing control signal and being operative to convert the image signal into a first data voltage based on the high gamma reference voltage and output the first data voltage during a first active period, and to convert the image signal into a second data voltage based on the low gamma reference voltage and output the second data voltage during a second active period;

a gate driving circuit being operative in response to the second timing control signal to output a first gate voltage during the first active period and output a second gate voltage during the second active period; and a display panel coupled to the gate driving circuit, the display panel including a plurality of pixels to display an image, each of which comprises a first sub-pixel coupled to receive the first data voltage in response to the first gate voltage and a second sub-pixel coupled to receive the second data voltage in response to the second gate voltage.

2. The display apparatus of claim 1, wherein the N is 2, and the i is 1.

3. The display apparatus of claim 2, wherein the selector is operative to output a first high gamma value and a first low gamma value smaller than the first high gamma value during an odd-numbered frame and to output a second high gamma value different from the first high gamma value and a second low gamma value smaller than the second high gamma value during an even-numbered frame.

4. The display apparatus of claim 3, wherein the gamma reference voltage generator outputs a first high gamma reference voltage corresponding to the first high gamma value and a first low gamma reference voltage corresponding to the first low gamma value during the odd-numbered frame and outputs a second high gamma reference voltage corresponding to the second high gamma value and a second low gamma reference voltage corresponding to the second low gamma value during the even-numbered frame.

5. The display apparatus of claim 3, wherein the first high gamma value and the first low gamma value represent a highest transmittance in a front viewing angle, and the second high gamma value and the second low gamma value represent the highest transmittance in a side viewing angle.

6. The display apparatus of claim 5, wherein the front viewing angle is about 90°, and the side viewing angle is about 45°.

7. The display apparatus of claim 5, wherein the first high gamma value is smaller than the second high gamma value, and the first low gamma value is smaller than the second low gamma value.

8. The display apparatus of claim 3, wherein the selection signal is in a high state during the odd-numbered frame and in a low state during the even-numbered frame.

9. The display apparatus of claim 1, wherein the selection signal is generated by the timing controller and is applied to the selector.

10. The display apparatus of claim 1, wherein the timing controller comprises one control chip, and the selector and the memory are mounted in the control chip.

11. The display apparatus of claim 1, wherein the first timing control signal comprises a first clock corresponding to the first active period and a second clock corresponding to the second active period.

12. The display apparatus of claim 11, wherein the gamma reference voltage generator outputs the high gamma reference voltage in synchronization with the first clock and outputs the low gamma reference voltage in synchronization with the second clock.

13. The display apparatus of claim 1, wherein the first sub-pixel comprises:

a first thin film transistor that outputs the first data voltage in response to the first gate voltage during the first active period; and a first sub-pixel electrode electrically connected to an output electrode of the first thin film transistor to receive the first data voltage, and the second sub-pixel comprises:

a second thin film transistor that outputs the second data voltage in response to the second gate voltage during the second active period; and a second sub-pixel electrode electrically connected to an output electrode of the second thin film transistor to receive the second data voltage.

14. The display apparatus of claim 13, wherein the first data voltage has a voltage level higher than a voltage level of the second data voltage.

15. The display apparatus of claim 14, wherein the display panel further comprises:

a first gate line connected to a control electrode of the first thin film transistor to receive the first gate voltage from the gate driving circuit during the first active period;

a second gate line connected to a control electrode of the second thin film transistor to receive the second gate voltage from the gate driving circuit during the second active period; and a data line commonly connected to input electrodes of the first and second thin film transistors to receive the first data voltage from the data driving circuit during the first active period and to receive the second data voltage from the data driving circuit during the second active period.

16. A method of driving a display apparatus that includes a plurality of pixels each of which comprises a first sub-pixel and a second sub-pixel to display an image, the method comprising:

receiving an image signal;

selecting one of N high gamma values and one of N low gamma values in a predetermined i frame unit in response to a selection signal, wherein N is an integer no less than 2, and further wherein i is an integer no less than 1;

outputting a high gamma reference voltage corresponding to the selected high gamma value and a low gamma reference voltage corresponding to the selected low gamma value;

converting the image signal into a first data voltage based on the high gamma reference voltage during a first active period and converting the image signal into a second data voltage based on the low gamma reference voltage during a second active period;

outputting a first gate voltage during the first active period and outputting the second gate voltage during the second active period; and charging the first data voltage to the first sub-pixel in response to the first gate voltage and charging the second data voltage to the second sub-pixel in response to the second gate voltage to display the image.

17. The method of claim 16, wherein the N is 2, and the i is 1.

18. The method of claim 17, wherein the selecting of the high and low gamma values comprises:

outputting a first high gamma value and a first low gamma value smaller than the first high gamma value during an odd-numbered frame; and outputting a second high gamma value different from the first high gamma value and a second low gamma value smaller than the second high gamma value during an even-numbered frame.

19. The method of claim 18, wherein the outputting of the high gamma reference voltage and the low gamma reference voltage comprises:

outputting a first high gamma reference voltage corresponding to the first high gamma value and a first low gamma reference voltage corresponding to the first low gamma value during the odd-numbered frame; and outputting a second high gamma reference voltage corresponding to the second high gamma value and a second low gamma reference voltage corresponding to the second low gamma value during the even-numbered frame.

20. The method of claim 18, wherein the first high gamma value and the first low gamma value correspond to a front viewing angle, and the second high gamma value and the second low gamma value correspond to a side viewing angle.

21. The method of claim 18, wherein the selection signal is in a high state during the odd-numbered frame and is in a low state in the even-numbered frame.

* * * * *